(12) United States Patent
Bayadzhan et al.

(10) Patent No.: US 10,102,767 B2
(45) Date of Patent: Oct. 16, 2018

(54) MUSICAL NOTATION KEYBOARD (71) Applicants: Andrey Aleksandrovich Bayadzhan, St. Petersburg (RU); Roman Ivanovich Ruditsa, St. Petersburg (RU)

(72) Inventors: Andrey Aleksandrovich Bayadzhan, St. Petersburg (RU); Roman Ivanovich Ruditsa, St. Petersburg (RU)

( * ) Notice: Subject to any disclaimer, the term of this patent is extended or adjusted under 35 U.S.C. 154(b) by 0 days.

(21) Appl. No.: 15/382,666

(22) Filed: Dec. 17, 2016

(65) Prior Publication Data

US 2017/0243506 A1 Aug. 24, 2017

Related U.S. Application Data

(60) Provisional application No. 62/269,911, filed on Dec. 18, 2015.

(51) Int. Cl.
*G09B 15/02* (2006.01)
*G10G 1/00* (2006.01)
*G10H 1/00* (2006.01)
*G06F 3/0481* (2013.01)
(Continued)

(52) U.S. Cl.
CPC .............. *G09B 15/023* (2013.01); *G10G 1/00* (2013.01); *G10H 1/0008* (2013.01); *G06F 3/0482* (2013.01); *G06F 3/0488* (2013.01); *G06F 3/04817* (2013.01); *G10H 2220/015* (2013.01); *G10H 2220/121* (2013.01); *G10H 2230/015* (2013.01)

(58) Field of Classification Search
CPC .... G09B 15/023; G10G 1/00; G06F 3/04817; G06F 3/0482; G06F 3/0488; G10H 2220/015

USPC ........................................................ 84/483.2
See application file for complete search history.

(56) References Cited

U.S. PATENT DOCUMENTS 4,474,098 A * 10/1984 Pepersack ............ G10H 1/0008
84/470 R
4,646,609 A * 3/1987 Teruo ................... G10H 1/0008
84/609

(Continued)

*Primary Examiner* — David Warren
*Assistant Examiner* — Christina Schreiber
(74) *Attorney, Agent, or Firm* — Nadya Reingand; Yan Hankin (57) ABSTRACT

The invention relates to the digital music writing being a digital musical notation symbols input tool. The invention is a keyboard specially dedicated for digital input of musical notation symbols. The keyboard is used for digital input of sheet music. The keyboard can be implemented as a physical device and shaped as combination of images in a touch screen. Every musical notation symbol shall be inputted with the keyboard control element specially dedicated for input of such symbol. Novelty of the invention is that the keyboard is a device specially dedicated for input of musical notation which does not require any accessories; all the musical notation symbols can be inputted using this keyboard only with the combination of two actions: indication of the symbol's location and the symbol itself; all the symbols shall be inputted as such, not by indication of their values; all the symbols which consist of elements, which have the values of their own shall be inputted by elements; the note heads, located vertically in different positions on the musical staff shall be considered as independent signs.

19 Claims, 4 Drawing Sheets

(51) Int. Cl.
*G06F 3/0482* (2013.01)
*G06F 3/0488* (2013.01)

(56) References Cited

U.S. PATENT DOCUMENTS

| | | | | |
|---|---|---|---|---|
| 4,655,117 A * | 4/1987 | Roose | ............... | G10H 1/20 84/423 B |
| 5,088,378 A * | 2/1992 | DeLaTorre | ............... | G10H 1/34 84/423 R |
| 5,129,303 A * | 7/1992 | Coles | ............... | G10H 1/0008 84/442 |
| 5,153,829 A * | 10/1992 | Furuya | ............... | G09B 15/002 379/110.01 |
| 5,202,526 A * | 4/1993 | Ohya | ............... | G10H 1/0041 84/462 |
| 5,783,764 A * | 7/1998 | Amar | ............... | G09B 15/08 84/464 R |
| 6,476,303 B1 * | 11/2002 | Mutou | ............... | G09B 15/026 84/483.1 |
| 6,476,304 B2 * | 11/2002 | Uehara | ............... | G10H 1/0008 704/231 |
| 6,740,802 B1 * | 5/2004 | Browne, Jr. | ............... | G10H 1/0025 84/609 |
| 7,241,945 B1 * | 7/2007 | Egan | ............... | G09B 15/00 84/471 R |
| 7,576,280 B2 * | 8/2009 | Lauffer | ............... | G10H 1/0008 84/470 R |
| 7,754,955 B2 * | 7/2010 | Egan | ............... | G09B 15/023 84/464 R |
| 8,338,684 B2 * | 12/2012 | Pillhofer | ............... | G09B 15/00 84/470 R |
| 8,629,342 B2 * | 1/2014 | Lee | ............... | G09B 15/00 84/477 R |
| 8,710,343 B2 * | 4/2014 | Kellett | ............... | G10H 1/38 700/94 |
| 8,912,418 B1 * | 12/2014 | Cohen | ............... | G09B 15/023 84/483.2 |
| 8,921,677 B1 * | 12/2014 | Severino | ............... | G09B 5/06 84/478 |
| 2002/0073826 A1 * | 6/2002 | Fiks | ............... | G09B 15/002 84/477 R |
| 2006/0032362 A1 * | 2/2006 | Reynolds | ............... | G09B 15/00 84/601 |
| 2008/0060499 A1 * | 3/2008 | Sitrick | ............... | G09B 15/002 84/477 R |
| 2008/0060507 A1 * | 3/2008 | Welchering | ............... | G10H 1/0016 84/645 |
| 2009/0173212 A1 * | 7/2009 | Wold | ............... | G09B 15/02 84/483.2 |
| 2013/0000462 A1 * | 1/2013 | Freiberg | ............... | G09B 15/023 84/477 R |
| 2013/0133506 A1 * | 5/2013 | Daisy | ............... | G09B 5/06 84/455 |
| 2014/0000438 A1 * | 1/2014 | Feis | ............... | G10G 1/00 84/453 |
| 2014/0260898 A1 * | 9/2014 | Bales | ............... | G09B 15/026 84/433 |
| 2015/0095822 A1 * | 4/2015 | Feis | ............... | G10G 1/00 715/765 |
| 2016/0217702 A1 * | 7/2016 | Caldwell-Edmonds | ............... | G10G 1/02 |
| 2017/0017393 A1 * | 1/2017 | Luo | ............... | G06F 3/04886 |
| 2017/0243506 A1 * | 8/2017 | Bayadzhan | ............... | G10H 1/0008 |

\* cited by examiner

MUSICAL NOTATION KEYBOARD

CROSS-REFERENCE TO RELATED APPLICATIONS

This application claims the benefit of U.S. Provisional Application No. 62/269,911, filed Dec. 18, 2015.

BACKGROUND OF THE INVENTION

The invention relates to the digital music writing being a digital musical notation symbols input and sheet music typing tool. The invention is a keyboard specially dedicated for digital input of musical notation symbols. The keyboard is used for digital input of sheet music.

There are two main principles of sheet music digital input: the typing principle and the touch screen handwriting. This invention is a system of sheet music typing, that is why the problems of sheet music typing developments have been considered below.

Now in the field of sheet music digital input a number of problems have been identified, which are closely connected to each other, while this invention was targeted to solve these problems. The basic one is to make the input systems understandable as well as to make the actions required from users to input the musical notation symbols and generate sheet music obvious. The existing input systems which are providing appropriate input of sheet music (i.e. which allows aiming the targets of music writing closely to the full amount) are difficult for understanding and mastering, a user has to apply significant efforts to master such systems.

The efforts needed to master the musical notation input system are great first of all because it is not obvious which action exactly will lead to input of any given group of symbols and why it will happen. The system interface is complex having a multilevel structure. So, to find the required options the user has to study orientation in this structure. It is required to create the notation input tool with its operation principles as universal and obvious as those of the QWERTY keyboard for texts. Like QWERTY, which would not require any preliminary education for mastering being clear for anyone acquainted with musical notation. Besides, the existing input systems require employment of multiple devices (computer keyboard, mouse, midi-keyboard). At least, without using such additional devices, convenience of the systems would be decreased. It is required to create a self-sufficient tool operated with one device with no harm to the convenience of operation.

Also the problem of equal accessibility for various groups of notation symbols and music writing operations is quite urgent. In the existing input systems the groups of musical notation symbols are distributed between different levels of interface and the transition from one operation to another is quite difficult. These systems require compliance with the sequence of operations, while any violation of such sequence would trigger significant inconveniences. Essentially, various groups of symbols are presented in separate menus, so, in process of input the user has to switch between the menus. At the same time, some groups of symbols are more accessible than the others, some actions are performed easier than the others. It is required to create a system of input where all the groups of symbols and operations regardless of their character would be generally accessible with all the actions performed with equal easiness, while switching from one action to another one would not require any additional actions.

Unification of the input method for all the groups of symbols is regarded as the music notation input system's perfection factor. In the existing systems such unification is missing. It is not infrequent that not only different groups of symbols, but also the elements of the same symbol use different input principles. Thus, the most important problem of the musical notations input is the input of so called musical notes. Note is a symbol, designating two parameters of the musical sound at once—pitch and duration. In the existing systems input of these two parameters uses different methods to the extent that the elements of one note designating these two parameters are using different devices for input. The method where indication of the pitch level parameter is made with midi-keyboard, while the duration is indicated by selecting the note value symbol from menu. It is required to create a system where all the musical notation input operations would be reduced to the combinations of the same few actions.

A critical disadvantage of the existing input systems is that the most important musical notation symbols are inputted not directly, but via indication of their respective values. First of all, this concerns recording of the sound's pitch parameter. Instead of inputting the note heads in the required locations on the musical staff, the sounds meant by those note heads shall be inputted (with midi-keyboard or computer keyboard where values of sounds from various octaves are assigned to the keys). This way of note heads input is as good as inputting of word writing characters by indication of phonemes could have been. In the perfect system of sheet music digital typing all the symbols must be inputted directly, not via indication of their values, i.e. using just a graphical principle.

The sheet music input systems, which are wide spread now, are distinguished eclecticism, i.e. they imply a collection of mixed-mode actions, corresponding to the structure of musical notation only more or less. To make correct the sheet music input system, one has to develop it in strict correspondence with the structure and logics of notation, while the very development method must provide for such compliance. The input system shall not make an eclectic combination of principles spontaneously created for some or other group of symbols, but result from analysis of the notation structure reproducing it precisely in digital form.

At present the input systems to provide for appropriate, i.e. multifunctional and convenient input of sheet music with mobile devices do not exist. The complications in adapting the sheet music input systems to mobile devices are conditioned great deal by the general problems as described above. For instance, the multileveled interface obviously would not aid convenience of applying such system in a mobile device. Also mixed-mode actions required for input of various groups of symbols, and much more application of different devices to solve different problems of music writing obviously obstacle the way of solving the problem of appropriate sheet music input with mobile devices. Besides, this problem is an urgent one, because it is required to create a possibility to perform digital music writing in the situations as diverse as those where now it is possible to input texts. Unification of all actions, reduction of the whole array to combinations of a few simple actions is the only proper way to achieve efficiency and convenience in digital input of sheet music with mobile devices.

BRIEF SUMMARY OF THE INVENTION

Figure 1:
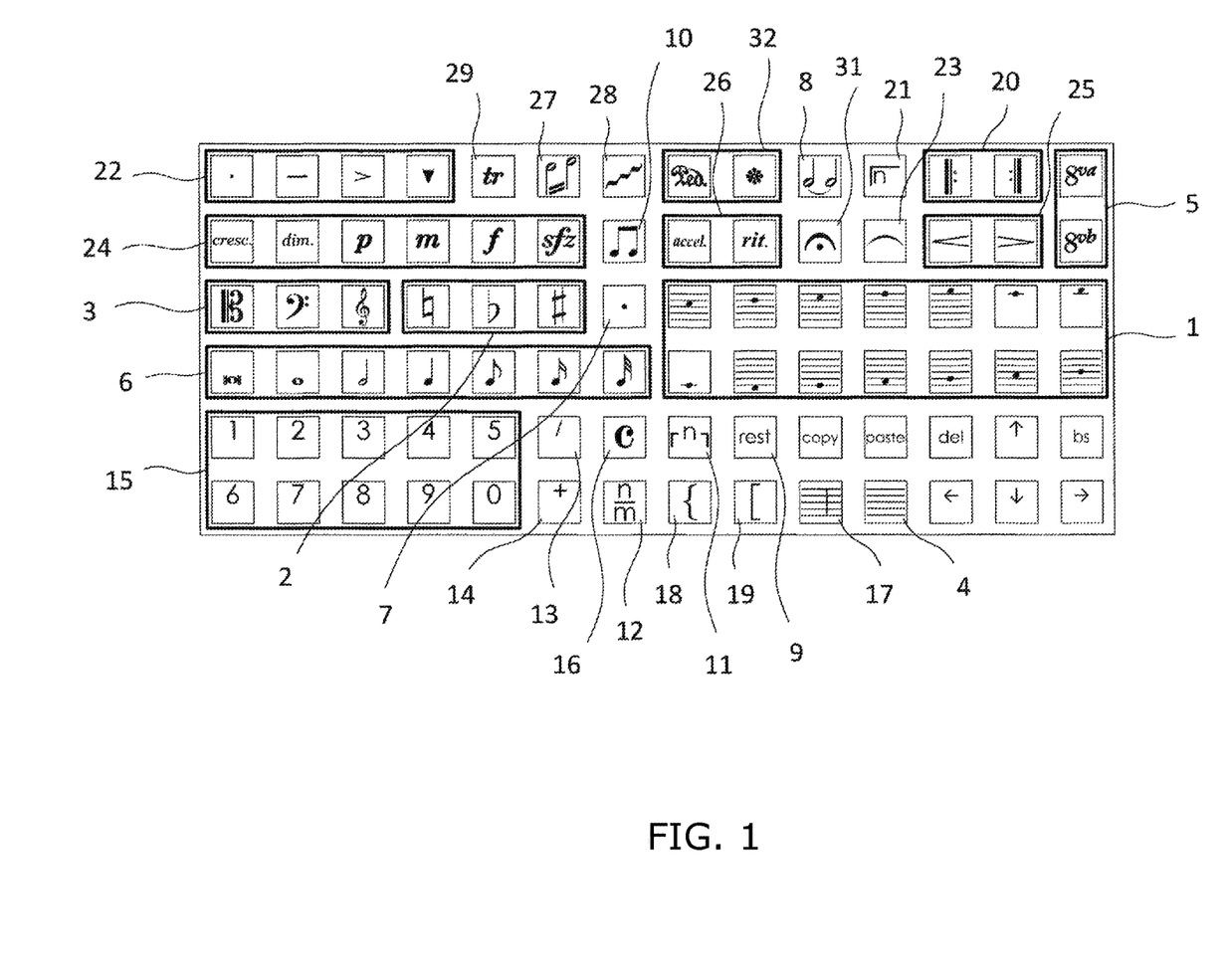
FIG. 1. A musical notation symbols input keyboard implemented as a physical device.
Figure 2:
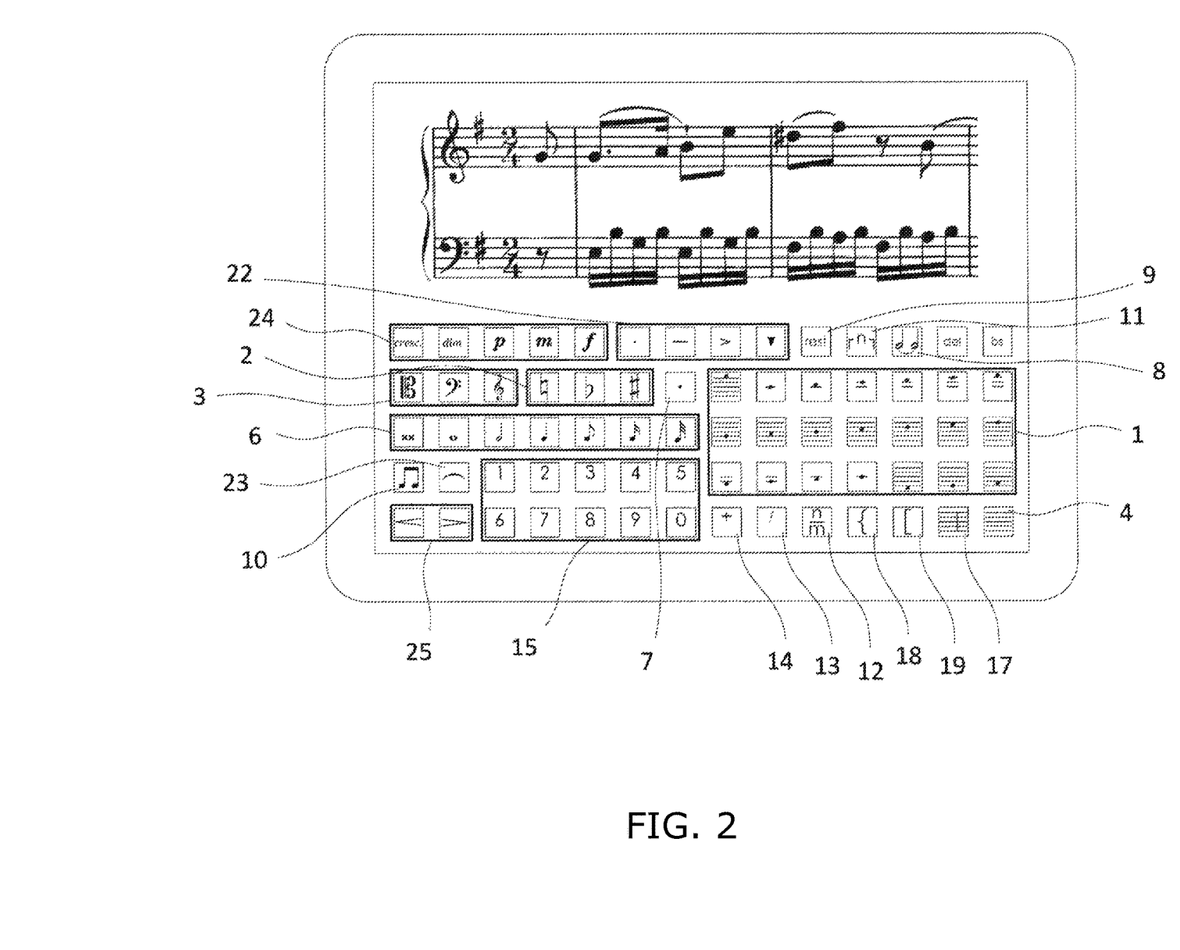
FIG. 2. A musical notation symbols input keyboard implemented as an aggregate of images in the touch screen.
Figure 3:
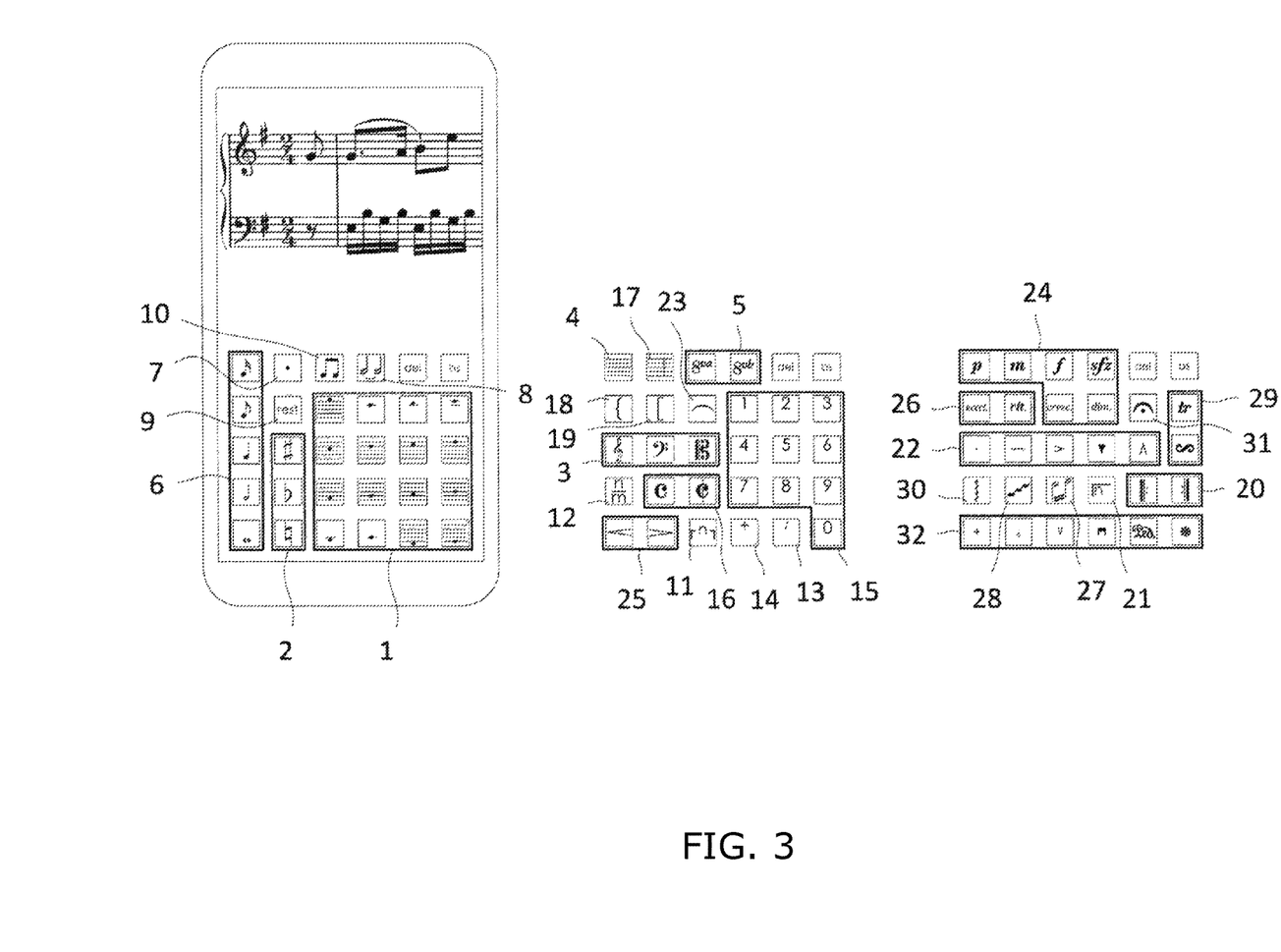
FIG. 3. A musical notation symbols input keyboard implemented as an aggregate of images in the touch screen, and this aggregate is divided into 3 units, which can replace one another in the screen by turning the pages or switching.

The keyboard can be shaped as physical devices differing in structure, including modular computer keyboards, i.e.

consist of components or units, virtual keyboards and others, connectible to the computer devices of various types, including desktop PC, laptops, single-board computers, tablets, wearable computers, mobile devices, etc. The keyboard can also be shaped as an aggregate of images on the display device, which could be intended for the touch screen devices. In FIG. 1 a keyboard shaped as a physical device can be seen. In FIG. 2 a keyboard shaped as an aggregate of images in the touch screen can be seen. In FIG. 3 a keyboard shaped as an aggregate of images in the touch screen can be seen, and this aggregate is divided into 3 units, which can replace one another in the screen by turning the pages or switching.

The keyboard is an aggregate of control elements used to input musical notation symbols. Every symbol to be inputted from the keyboard corresponds to a specific control element in the keyboard which serves to input such symbol.

Figure 4:
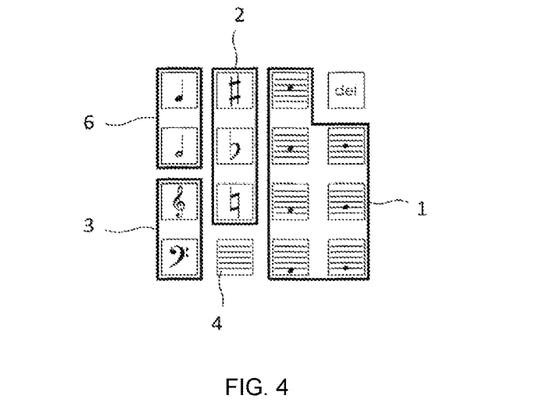
FIG. 4. A keyboard for input of musical notation symbols designating pitches and durations of the sounds.

Various keyboard solutions are possible depending on which set of notation symbols exactly is presented in the keyboard. It is possible to create the keyboard solutions intended for creation of more or less difficult music writing solving the problems of music writing to a smaller of bigger extent. It is possible to create the solutions intended for the users who need to solve only some of the music writing problems as well as those intended for the users who require solving of the music writing problems to biggest extent possible. Depending on the keyboard's intended music writing problems it will be furnished with the control elements serving for input of some or other symbols of musical notation in a bigger or smaller quantity. In FIG. 4 a keyboard whose functions are limited to input of musical notation, indicating pitch and duration of sounds is shown. In FIG. 1, 2, 3 the keyboards intended for solving a wide range of music writing problems are shown.

The keyboard control elements, intended for input of musical notation symbols shall be furnished with the images indicating the musical notation symbols of its intention. The most natural implementation of the keyboard will be that one where the control elements have those very musical notation symbols depicted on them, which they are intended to input.

The keyboard structure based on the principle of using the minimum of actions possible to input any symbol. Any symbol of musical notation can be inputted from the keyboard by a single action, namely by operation of the control element which serves for input of such symbol. At the same time the methods used to input musical notation from keyboard depend on specificity of such symbols.

The essential problem of the music writing digital input is to input musical notes, i.e. the symbols of which every one designates pitch and duration of some sound simultaneously. The keyboard structure solves this problem based on the fact that a musical note is not a single symbol but a composition of symbols where one symbol serves to indicate the sound's pitch—a note head, while another one serves to indicate the sound's duration—note value symbol. At the same time, the keyboard shall follow the essential principle of music handwriting, according to which a note is composed of a note head and duration symbol placed in a certain place of the sheet music—in a certain position on the certain musical staff together with such musical staff, clef and accidental when required, acquiring the value of indicating the sound with certain pitch and duration.

To indicate a specific sound pitch in musical notation one should put a note head to the certain vertical position on the musical staff, i.e. on, above or beneath one of the lines or in one of the gaps between the musical staff lines, put a clef adding accidental when required. In music handwriting a certain line in the musical staff shall be selected or a gap between the lines and on this line or in this gap a note head shall be written. Respectively, the sounds' pitch parameter shall be recorded with the keyboard using a group of special control elements of which each one serves for indication of the note head's certain vertical position on the musical staff. The sounds' duration shall be recorded with the keyboard using a group of special control elements of which each one serves for input of the certain note value symbol.

To input a musical note from the keyboard it is required to input its component symbols: a head in certain vertical position on the musical staff, on, above or beneath one of the lines or in the gap between the musical staff lines plus the required duration symbol, while each of the symbols mentioned shall be inputted with the single action. To the musical note generated this way accidental can be added when required making a designation which together with the clef will indicate a sound with the certain pitch and duration. The note can be added dotes to increase the duration in the required number.

In the described input method a note acquires the value of indicating the sound of certain pitch because the note head location is set, above or beneath a certain line or in a certain gap between the musical staff lines, while such location is set by operation of a keyboard control element, designating that very location but not the sound as such. In another words the keyboard inputs not the notes, indicating certain sounds, for instance, A in one-lined octave or C in small octave, but notes in certain positions, say, a note with its head on the third line of the musical staff, or a note with its head between the first and second lines of the musical staff, which taken together with the clef will acquire the value of indicating the sounds with the certain pitch.

Among the musical notation symbols there are such ones whose value depends on both their length and location, while the length and location are required to be indicated individually each time. This sort of symbols includes brackets and braces, phrase marks (ligature), graphical designations for crescendo and diminuendo indications, glissando, octave signs and other similar symbols. According to the keyboard structure principle, each of these symbols can be inputted by a single action, but then it will have a standard length as determined by its standard font. To enter one of such symbols in specific location with specific length one should perform more than one action, namely, to set location for the symbol's beginning and end, and then input the symbol.

To set the beginning and end of the symbol it is required to use the control elements intended for the standard computer functions used in texts, such as cursor control, etc. The standard computer functions are not key features of the keyboard and the amount of such functions presented on the keyboard may vary depending in particular on the specific user's tasks of music writing, which the keyboard solution is intended for.

There are some symbols applied in musical notation, which are not specific for musical notation, like, for example, digits. They are used for recording time signatures and can be included in the complex musical notation symbols. The possibility to input the symbols which are not specific for musical notation assumes that the keyboard shall be furnished with the control elements, intended for such symbols input.

The complex musical notation symbols, which contain digits, include such symbols as tuplets, for example, triplets, volta brackets and the similar signs. To input one of these signs with certain location and length it is required to determine the place of its beginning and ending, input the sign operating the control element, which is responsible for input of such symbol, input the numerical value contained in this symbol operating the control elements responsible for input of digits.

The described musical notation symbols input methods are included in the keyboard structure basic method. The method implies the input performed according to the typing principle, i.e. any symbol is inputted in its standard font form by operation on the keyboard control element; a symbol is inputted by indication of the symbol itself, but not its value; a complex symbol, i.e. the symbol which includes multiple elements is inputted by elements, while every element of the complex symbol is inputted as a single simple symbol.

Figure 5:
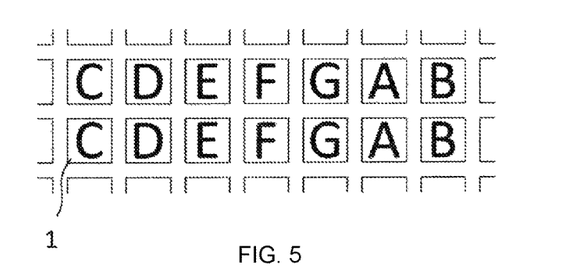
FIG. 5. A group of the keyboard control elements, serving for input of designations for the sounds' pitches via indication of sounds with specific pitch.

However, the keyboard's particularity implies the possibility of such keyboard solutions where the described method can be combined with other principles—the principle of symbols input by indication of their respective values. Thus, input of musical notes which designate the sounds of specific pitches and durations can be performed in such a way, where note value input is performed as described above, while pitch input is performed by operation of the control elements responsible for input of sounds with specific pitch rather than indication of the note heads vertical positions on the musical staff. In FIG. 5 a group of the keyboard control elements, serving for input of sounds pitch indication by indication of sounds with specific pitch, where each of the control elements bears letter name of the sound can be seen.

Also, for example, when the keyboard is intended for touch screen devices, it is possible to make a solution where input of some part of the symbols is performed by operation on the keyboard control elements, while another part, like slures, is inputted by drawing them on the touch screen, or the same symbols can be inputted by two methods: both by operation of the keyboard control elements and drawing on the touch screen at the option of the user.

The keyboard structure assumes that all the sheet music generation operations regardless of their specificity shall be available directly from the keyboard, performed according to the general procedure, and the direct switching from one of such operations to another one in process of the sheet music generation is always available, while such switching shall not require any additional operations. Thus, for example, input of musical notes, generation of musical score, including input of musical staffs and placement of braces and brackets, articulation marks, dynamic and other indications accompanying the note signs, time signatures, etc. are the operations significantly differing by their character, but all of them shall be performed with the keyboard according to the general procedure with the possibility of direct switching from any of them to another one at any point of the sheet music input without any additional operations.

Minimization of the operations required for input of the musical notation symbols with no additional operations required to switch from one operation of sheet music generation to another one are the factors to determine high speed of music writing input with the keyboard.

Compliance of the keyboard operation principles with the natural principles of handwriting has determined simplicity and easiness of the keyboard operation, minimization of efforts required from user for learning to use the keyboard.

Besides that the keyboard structure allows the functions which facilitate the sheet music generation, such as "copy" and "paste", many of the music writing operations performed with the keyboard, can be simplified, namely, by automation performed with the help of the software. They are such operations as, for example, placement of bar lines and the similar operations.

Keyboard control elements serving for input of the following symbols:
1. note heads in specific vertical positions on the musical staff,
2. accidentals,
3. clefs,
4. musical staff,
5. octave signs,
6. note values,
7. note values increasing dot,
8. tie,
9. rest indication,
10. beam for beaming notes,
11. tuplet,
12. time signature,
13. division,
14. plus,
15. digits from 0 to 9,
16. common time and alla breve,
17. bar line,
18. brace,
19. bracket,
20. repeat signs,
21. volta brackets,
22. articulation marks,
23. phrase mark (ligature),
24. dynamics,
25. graphical designations for crescendo and diminuendo,
26. tempo signatures,
27. tremolando,
28. glissando,
29. ornaments,
30. arpeggiato,
31. fermata,
32. instrument-specific notation,
33. rests.

Note: The keyboard control elements, serving for input of the same symbols have same numbers in all the figures.

DETAILED DESCRIPTION OF THE INVENTION

The musical notation input keyboard is an aggregate of control elements, such as the control elements serving for input of musical notation symbols, control elements serving for input of the symbols which are not specific for musical notation, but used in musical notation, control elements serving for the standard computer functions used in working with texts.

The keyboard control elements serving for input of the musical notation symbols include those serving for input of the symbols used for designation of the sounds' pitch, such as note heads 1, accidentals 2, clefs 3, musical staff 4, octave signs 5; control elements serving for input of the symbols used for designation of the sounds' duration, such as note values 6, dots to increase note values, 7, tie 8, grouping of note values with beams 10, control elements serving for input of time signatures 12, 16, control elements serving for input of tuplets 11, control elements serving for input of rests 9, 33, control elements serving for input of braces and brackets 18, 19, control elements serving for input of bar lines of various shape 17, 20, control elements serving for input of articulation marks 22, control elements serving for input of phrase marks 23, control elements serving for input of dynamics 24, 25, control elements serving for input of tempo signatures 26, control elements serving for input of ornaments 29, control elements serving for input of instrument-specific notation 32, control elements serving for input of tremolando 27, glissando 28, volta brackets 21, fermata 31 and other musical designations.

The keyboard control elements serving for input of the symbols which are not specific for musical notation, such as digits 15, plus sign 14, division sign 13.

The keyboard control elements serving to perform standard computer functions, same as used in working with texts, include those, which serve for indication of the symbols' location. The keyboard control elements serving for indication of the symbols' location can be those used for moving cursor. The functions of such control elements can be performed via the touch screen.

The keyboard control elements serving for input of the musical notation symbols can bear the images of such symbols, and the control element serving for input of some symbol shall bear the image of the same symbol whose input it serves for. However, a significant feature of the keyboard is that each of the musical notation symbols inputted with this keyboard corresponds to the dedicated control element, which serves for input of the symbol, but images placed on the control elements serving for input of some certain musical notation symbols need not be the image of the same symbols.

The special keyboard control elements serving for input of the symbols used for indication of the sounds' pitch: the control elements serving for input of note heads 1, accidentals 2, clefs 3, and musical staff 4.

The special keyboard control elements serving for input of the symbols used for indication of the sounds' durations: the control elements serving for input of note values 6, dotes to increase note values 7, ties 8.

Input of all the symbols listed above shall be performed by the single action—operation of the control element, corresponding to the respective symbol.

The control elements used for input of note heads and duration signs serve for generation of musical notes, i.e. the symbols which designate the following two parameters of the sound simultaneously: the sound's pitch and duration.

Each of the control elements serving for input of note heads shall provide for input of the note head in a specific vertical position on the musical staff: either on one of the lines or in one of the gaps between the lines, beneath the lower line, or above the top line, or on the leger lines of the musical staff, or beneath, or above them. With the inserted clef and accidentals when required the note head inputted in a certain vertical position on the musical staff will designate a sound of the certain pitch. However the note head look as it has in the sheet music to be inputted depends on duration of the sound which it is designating.

To input the musical note which has some certain looks and designating two parameters of the musical sound—its pitch and duration, one should operate the control element, which serves for input of the note head in the required vertical position on the musical staff, as well as to operate the control element which serves for input of the required note value symbol. As the result of these actions, provided that the clef and accidentals when required have been inserted, input of the musical note to designate a sound of the certain pitch and duration, will be performed. When required, this note can be added with the required number of dots to increasing the duration, the note can be connected with the tie to another note, designating the sound of the same pitch.

The keyboard can be supplied with various number of control elements, serving for input of note heads in certain vertical positions on the musical staff.

Figure 6:
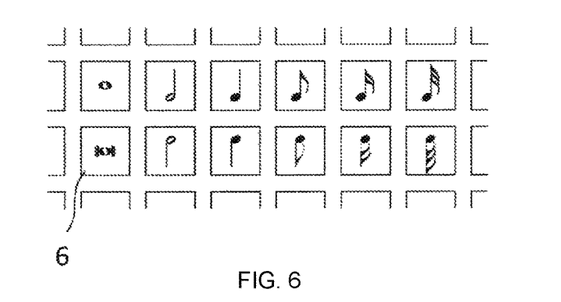
FIG. 6. A group of the keyboard control elements, which serve for input of the sounds' note value symbols, containing special control elements for input of the symbols having stems in opposite directions.

The number of the keyboard control elements serving for input of note values can be varied. Various keyboard solutions are possible depending on that, whether the same note values with the stems of opposite directions shall be inputted with the same control element, or each of such symbols shall be inputted using an individual control element. FIG. 6 shows a group of control elements used for input of note values which includes two control elements to input each of durations, of which one has its stem up and another one has its stem down.

The keyboard control elements serving for input of note heads in certain vertical positions on the musical staff can bear images of the note heads in the respective vertical positions on the musical staff. Such control elements can bear other images as well, for example, letter names. In FIG. 1, 2, 3, 4 the keyboards of which each one has a group of control elements serving for input of note heads in certain vertical position on the musical staff and bearing the images of the note heads in the respective positions are shown. In FIG. 5 a group of keyboard control elements bearing letter names of the sounds with respective pitch is shown.

If the clef is inputted in the certain vertical position on the musical staff, then the number of operations required to input the clef and the number of control elements operated to input such clef will depend on that, which clef namely and on which line of the musical staff is to be inputted.

To input any clef on the certain line on the musical staff one should operate the control element responsible for input of the respective clef and indicate on which line namely of the musical staff the clef should be located. Indication of the line, where the clef should be located can be performed by operation of the control element which serves for input of note head on the same musical staff line where the clef should be located.

Besides, if the G-clef should be located on the second line of the musical staff in the bottom, then it can be inputted by single operation of the control element, which serves for input of the G-clef. If the F-clef should be located on the fourth line of the musical staff in the bottom, then it can be inputted by single operation of the control element, which serves for input of the F-clef.

Besides, for recording the alto clef and tenor clef there is a method, which assumes one operation to input one of these clefs, and two operations to input another one, while in both cases the same control element is operated. There are two options for implementation of this method. In the first option the single operation of the control element serving for input of the C-clef shall provide for input of the C-clef on the third line of the musical staff, double operation of the same control element shall provide for input of the C-clef on the fourth line of the musical staff in the bottom. In the second option the single operation of the control element serving for input of the C-clef shall provide for input of the C-clef on the fourth line of the musical staff in the bottom, double operation of the same control element shall provide for input of the C-clef on the third line of the musical staff.

The rest symbols can be inputted from the keyboard using various methods, and the method of rest input shall determine, which of the rest input control elements shall be included in the keyboard.

Figure 7:
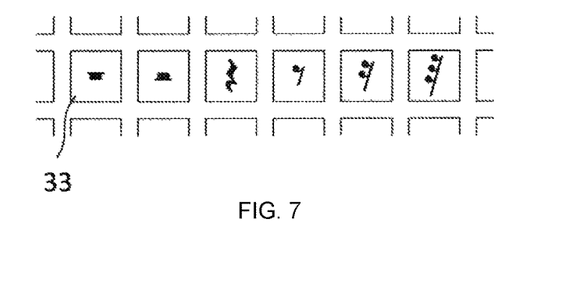
FIG. 7. A group of the keyboard control elements of which each is serving for input of rest with specific duration.

There is a method where the keyboard has control elements of which each one serves for input of the rest with some certain duration. With this method input of the rest having a specific duration is performed by single operation of the control element, which serves for input of such rest. In FIG. 7 a group of the keyboard control elements of which each is serving for input of the rest with specific duration.

With the second method the keyboard shall have a special control element which serves for input of rests 9; the rests shall be inputted by operation of the special control element, which serves for input of rests and operation of the control element which serves for input of some note value. A combination of these actions shall provide for input of the rest, whose duration corresponds to the duration characteristic to that duration control element which has been operated.

The dedicated keyboard control elements serving for input of the bar lines varying in shape and purpose 17, 20, articulation marks 22, dynamics 24, tempo signatures 26, ornaments 29, fermata 31. Input of all the symbols listed above shall be performed by the single action—operation of the control element, dedicated to input of the respective symbol.

Among the designations listed there are ones which consist of more than one symbol, for example, mP, mF. The keyboard can have special control elements dedicated to input of the similar frequently used designations, which include more than one symbol. The keyboard can also have the control elements serving for input of individual symbols included in such designations, which include more than one symbol as shown in FIG. 1, 24. In this case input of such designations, which consist of more than one symbol, shall be performed by operation of the control elements dedicated for input of the individual symbols included in such designations.

There are a keyboard control elements dedicated to input braces 18 and brackets 19.

To input the brace to unite two or more musical staffs it is required to operate the control element which serves for input of such brace 18, as well as to indicate the musical staff where the brace is beginning and the one where it is ending. When it is required to input a brace to embrace only one musical staff without connection to others, then to input such brace it will be enough to operate the control element which serves for input of brace and select the musical staff.

To input the single bracket to unite two or more musical staffs it is required to operate the control element which serves for input of such bracket 19, as well as to indicate the musical staff where the bracket is beginning and the one where it is ending. For input of multiple brackets to embrace only one musical staff there is a method which requires to operate the control element which serves for input of the brackets 19, to input of the required number of brackets to be inputted, to operate the control elements dedicated to input of digits 15, and to select the musical staff to be embraced. For input of two or more brackets to embrace two or more musical staffs there is a method which requires the same actions with the only difference that it is required to select the musical staff where the brackets are beginning and the one where they are ending.

There are keyboard control elements dedicated to input the symbols of graphical designations for crescendo and diminuendo 25, phrase marks 23, octave signs (transfers one octave up and transfers one octave down) 5, glissando 28. To input one of the above listed symbols with specific location and length it is required to indicate locations of the symbol's end points and operate the control element, which serves for input of such symbol.

For input of the multiple octave transfer symbol (for example 15ma sign) there is a method, where the same operations are performed as for the one octave transfer with the only difference that it is required to operate control elements dedicated to input of the one octave transfer symbol as many times as many octaves transfer the symbol to be inputted should designate.

Also there is another method to input the octave sign. For this purpose it is required to set location of the octave transfer symbol's ends, operate the control element, which serves for input of the octave transfer symbol 5, operate the control elements which serve for input of digits 15, and input the number indication of interval, corresponding to the required number of octaves, to which the transfer is being made as indicated by the symbol to be inputted.

There is a keyboard control element dedicated to input of tremolando indications 27. To input tremolando in the specific position between notes it is required to input the note symbol located to the left from the tremolando symbol, operate the control element, which serves for input of tremolando, operate the control element which serves for input of the note value less than one quarter. This way the tremolando will be inputted with as many lines as many flags had the note value, indication of which was performed. Then the note symbol located to the right from tremolando should be inputted.

There is a keyboard control element dedicated to input of tuplet 11. To input this symbol in the specific position in the sheet music it is required to operate the control element which serves for input of the tuplet, operate the control element(s) which serve(s) for input of digits 15 and input the number included in this symbol to indicate the number of shares into which the total time value of the note and rest symbols united by this symbol is divided.

Input of the tuplet to divide the total time value of the notes united by the tuplet into 3 shares (so called triplet) which is the most commonly used tuplet can be performed using a simplified method. For this purpose one should perform the same actions as described for input of any tuplets, excluding operation of the control elements serving for input of digits.

There is a keyboard control element dedicated to input of volta brackets 21. To input the volta bracket symbol into specific position in the sheet music, it is required to indicate location of its ends, operate the control element which serves for input of the volta bracket symbol, operate the control element(s) which serve(s) for input of digits 15 and input the number indication included beneath this symbol.

There is a keyboard control element dedicated to input beaming notes, i.e. replacement of note value flags which are equal or less than ⅛ with beams. To input two or more beamed notes, it is required to operate the control element which serves for replacement of note value flags which are equal or less than ⅛ with beames 10, then input the required notes.

There is a keyboard control element dedicated to input of time signatures 12.

To input a time signature in the shape of a fraction it is required to operate the control element which serves for input of time signatures, operate the control elements, which serve for input of digits 15, and input the number required in the numerator, then operate the control element which provides for switching to input of denominator 13, then input the number required in the denominator.

To input a complex time signature shaped as a fraction, where numerator is made by a sum of a few numbers, it is required to operate the control element, which serves for input of time signature 12, operate the control elements, which serve for input of digits 15, and input the first of the numbers required in the numerator, operate the control element, which serves for input of plus symbol 14, operate the control elements, which serve for input of digits 15 and input the next number required in the numerator. This way all the numbers required in the numerator shall be inputted together with plus signs between them, then operate the control element which provides for switching to input of denominator 13, then input the number required in the denominator.

To input a complex time signature shaped as a sum of fractions it is required to complete the same actions as required to input time signature shaped as a fraction with the single numerator, then operate the control element, which serves for input of plus sign 14, and input plus, complete the same actions as required to input time signature shaped as a fraction with the single numerator. This way input as many time signatures shaped as fractions with single numerator and plus sign between them as required.

Besides a time signatures shaped as fractions there are other forms of time signatures, all of them can be inputted from the keyboard. To input a time signature shaped as a single number it is enough to operate the control element which serves for input of time signatures and the control element(s) which serve(s) for input of digits. To input a time signature shaped as two or more fractions, followed directly by one another, it is required to complete the same actions as for input of the sum of fractions only without input of plus sign between then. If the time signature is shaped as two or more fractions, followed directly by one another, where all fractions or part of them are in parentheses, then the input shall be performed by the same method, only for this purpose a keyboard solution which includes control elements for parentheses is required. Time signatures shaped as conventional symbols, which do not include digits can be inputted with the help of control elements dedicated to such symbols as shown in FIGS. 1 and 3, 16. To simplify the input procedure some of the most common time signatures in the shape of fractions can be inputted with the special control elements dedicated for input of such symbols.

We claim:

1. A keyboard for digital input of musical notation symbols, comprising:
    an aggregate of control elements, each control element serving for input of a unique musical notation symbol characteristic,
    wherein the aggregate of control elements comprises at least:
        a first set of control elements for designating a position of a note head, wherein each element of said first set of control elements comprises an image, the image showing a vertical position of the note head on a musical staff,
    wherein an input of each element of the first set of control elements results in a note head being positioned on a digital music sheet.

2. The keyboard of claim 1, wherein each note head positioned on the digital music sheet corresponds to a given sound only when a clef is indicated.

3. The keyboard of claim 1, wherein the aggregate of control elements further comprises:
    a second set of control elements for designating a note value,
    wherein an input of each element of the second set of control elements results in a note value being positioned on the digital music sheet,
    wherein a combination of a note value with a note head on the digital music sheet forms a musical note.

4. The keyboard of claim 3, wherein the aggregate of control elements further comprises:
    a third set of control elements for designating symbols comprising rests, note value increasing dots, accidentals, clefs, dynamics, repeat signs, articulation marks, tremolando, ornaments, arpeggiato, fermata, glissando, tuplets, triplets, volta brackets, ties, beams for beaming notes, brackets, braces, ligature, crescendo, diminuendo, bar lines, musical staffs, and octave signs,
    each control element of said third set of control elements corresponding to a given symbol.

5. The keyboard of claim 4, wherein a length of brackets, braces, ligature, crescendo, diminuendo, glissando, octave signs, tuplets, triplets, or volta brackets, is designated by setting a beginning and an end of the symbol via a cursor.

6. The keyboard of claim 5, wherein the aggregate of control elements further comprises:
    a fourth set of control elements for an input of time signatures.

7. The keyboard of claim 6, wherein the aggregate of control elements further comprises:
    control elements for a copy/paste functionality.

8. The keyboard of claim 1, wherein the keyboard is located on a touch screen.

9. The keyboard of claim 8, wherein the keyboard comprises at least two pages, wherein only one page is displayed at a given time, wherein a user of the keyboard switches between said at least two pages.

10. A method for digital input of musical notation symbols, comprising:
    providing a keyboard comprising an aggregate of control elements, each control element serving for input of a unique musical notation symbol characteristic,
    designating a position of a note head via operating a control element located within a first set of control elements on said keyboard, wherein each control element of the first set of control elements comprises an image, the image showing a vertical position of the note head on a musical staff, and displaying the note head positioned on a digital music sheet as a result of operating the control element.

11. The method of claim 10, further comprising:

designating a note value by operating a note value control element located within a second set of control elements on said keyboard, and displaying the note value on the digital music sheet as a result of operating the note value control element.

12. The method of claim 11, further comprising:

designating any of the following symbols: rests, note value increasing dots, accidentals, clefs, dynamics, repeat signs, articulation marks, tremolando, ornaments, arpeggiato, fermata, glissando, tuplets, triplets, volta brackets, ties, beams for beaming notes, brackets, braces, ligature, crescendo, diminuendo, bar lines, musical staffs, or octave signs, by operating a third set of control elements on the keyboard, and displaying a corresponding symbol on the digital music sheet as a result of operating the third set of control elements.

13. The method of claim 12, further comprising:

designating a length of any brackets, braces, ligature, crescendo, diminuendo, glissando, octave signs, tuplets, triplets, or volta brackets on the digital music sheet by setting a beginning and an end of the symbols via a cursor.

14. The method of claim 13, further comprising:

designating a time signature by operating a fourth set of control elements located on said keyboard, said fourth set of control elements comprising one or more time signature elements, and displaying the time signature on the digital music sheet as a result of operating the one or more time signature elements.

15. The method of claim 11, wherein the designating and displaying of a note head and the designating and displaying of a note value occur in any order.

16. The method of claim 12, wherein the designating and displaying of a note head, the designating and displaying of a note value, and the designating and displaying of an accidental occur in any order.

17. The method of claim 10, wherein the keyboard is located on a touch screen.

18. The method of claim 15, wherein the keyboard is located on a touch screen.

19. The method of claim 16, wherein the keyboard is located on a touch screen.

* * * * *